US012695328B1

(12) United States Patent
Kelly et al.

(10) Patent No.: US 12,695,328 B1
(45) Date of Patent: Jul. 28, 2026

(54) SYSTEMS AND METHODS FOR WIRELESS CHARGING ON A MARINE VESSEL

(71) Applicant: Brunswick Corporation, Mettawa, IL (US)

(72) Inventors: Brennan J. Kelly, Urbana, IL (US); David J. Belter, Oshkosh, WI (US); Eric J. Rego, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 662 days.

(21) Appl. No.: 18/118,531

(22) Filed: Mar. 7, 2023

(51) Int. Cl.
| | |
|---|---|
| *H02J 50/10* | (2016.01) |
| *B60L 53/38* | (2019.01) |
| *B60P 3/10* | (2006.01) |
| *B60R 16/033* | (2006.01) |
| *H02J 50/40* | (2016.01) |
| *H02J 50/90* | (2016.01) |

(52) U.S. Cl.
CPC ............ *H02J 50/10* (2016.02); *B60P 3/1033* (2013.01); *B60R 16/033* (2013.01); *H02J 50/40* (2016.02); *H02J 50/90* (2016.02); *B60L 53/38* (2019.02)

(58) Field of Classification Search
CPC . H02J 50/10; H02J 50/40; H02J 50/90; B60P 3/1033; B60R 16/033; B60L 53/38
See application file for complete search history.

(56) References Cited

U.S. PATENT DOCUMENTS

| | | |
|---|---|---|
| 7,218,118 B1 | 5/2007 | Gonring |
| 8,043,132 B1 | 10/2011 | Wyant |
| 8,638,060 B2 | 1/2014 | Bruneau |
| 9,054,555 B1 | 6/2015 | Ward |
| 9,533,747 B2 | 1/2017 | Arbuckle et al. |
| 9,742,202 B2 | 8/2017 | Niizuma |
| 9,904,293 B1 * | 2/2018 | Heap .......................... G05D 1/12 |

(Continued)

FOREIGN PATENT DOCUMENTS

| | | | |
|---|---|---|---|
| CN | 112078397 | * | 12/2020 |
| WO | 2022159030 | | 7/2022 |

OTHER PUBLICATIONS

Kalnins, et al. "Electric Marine Propulsion System and Control Method", Unpublished U.S. Appl. No. 17/695,200, filed Mar. 15, 2022.

(Continued)

*Primary Examiner* — Richard V Muralidar
(74) *Attorney, Agent, or Firm* — Andrus Intellectual Property Law, LLP

(57) ABSTRACT

A system for charging at least one electrical energy storage device on a marine vessel is provided. The system includes a charging structure having at least one structure charging pad. The at least one structure charging pad is coupled to a power source and is configured to wirelessly transfer power to at least one vessel charging pad on a marine vessel in order to charge the at least one electrical energy storage device on the marine vessel. The at least one vessel charging pad and the at least one charging structure pad are configured to be moved relative to each other to bring the at least one vessel charging pad and the at least one structure charging pad proximate each other such that a predetermined parameter is satisfied to charge the at least one electrical energy storage device using the power source for a sustained period.

22 Claims, 10 Drawing Sheets

(56) References Cited

U.S. PATENT DOCUMENTS

| | | | |
|---|---|---|---|
| 10,256,659 | B2 | 4/2019 | Ferguson et al. |
| 10,367,378 | B2 | 7/2019 | Niizuma |
| 11,075,544 | B2 | 7/2021 | Niizuma |
| 11,518,261 | B2 | 12/2022 | Gonring |
| 12,128,780 | B1 * | 10/2024 | Booth .................... B60L 53/38 |
| 12,479,543 | B2 * | 11/2025 | Kelly .................... B63B 39/02 |
| 2017/0015397 | A1 * | 1/2017 | Mitchell ............... B63H 21/17 |
| 2021/0394625 | A1 | 12/2021 | Curran et al. |
| 2021/0394633 | A1 | 12/2021 | Curran et al. |
| 2022/0055494 | A1 | 2/2022 | Gyland et al. |
| 2022/0239151 | A1 | 7/2022 | Mikalsen |

OTHER PUBLICATIONS

Yu, et al., "Review of Crucial Problems of Underwater Wireless Power Transmission", Electronics 2023, 12, 163. Available from the Internet URL: https://doi.org/10.3390/electronics12010163.

Bai, et al., "Charging Electric Vehicle Batteries: Wired and Wireless Power Transfer", IEE Power Electronics Magazine, published Jun. 2022.

Mohsan, et al., "A Review on Research Challenges, Limitations and Practical Solutions for Underwater Wireless Power Transfer", (IJACSA) International Journal of Advanced Computer Science and Applications, vol. 11, No. 8, 2020. Available from the Internet URL: www.ijacsa.thesai.org.

Teeneti, et al., "Review of Wireless Charging Systems for Autonomous Underwater Vehicles", IEE Journal of Oceanic Engineering, vol. 46, No. 1, Jan. 2021. Available from the Internet URL: https://www.ieee.org/publications/rights/index.html.

* cited by examiner

800

802
GENERATE AN ELECTRICAL CURRENT
ON A CHARGING STRUCTURE

804
SUPPLY THE ELECTRICAL CURRENT
TO INDUCTIVE CHARGING PAD(S)
ON THE CHARGING STRUCTURE

806
INDUCE AN ELECTRICAL CURRENT
ON THE INDUCTIVE CHARGING
PAD(S) ON THE MARINE VESSEL

808
SUPPLY THE INDUCED ELECTRICAL
CURRENT TO A POWER STORAGE
SYSTEM ON THE MARINE VESSEL

SYSTEMS AND METHODS FOR WIRELESS CHARGING ON A MARINE VESSEL

FIELD

The present disclosure relates to systems and methods for wireless charging of power storage devices on a marine vessel.

BACKGROUND

The following U.S. Patents and U.S. Patent Applications provide background information and are incorporated herein by reference, in entirety.

U.S. Pat. No. 7,218,118 is directed to a method for monitoring the condition of a battery of a marine propulsion system that provides the measuring of a voltage characteristic of the battery, comparing the voltage characteristic to a preselected threshold value, and evaluating the condition of the battery as a function of the relative magnitudes of the voltage characteristic and the threshold value. The voltage characteristic of the battery is measured subsequent to a connection event when a connection relationship between the battery and an electrical load is changed. The electrical load is typically a starter motor which is connected in torque transmitting relation with an internal combustion engine. The voltage characteristic is preferably measured at its minimum value during the inrush current episode immediately prior to cranking the internal combustion engine shaft to start the engine.

U.S. Pat. No. 8,043,132 is directed to a hybrid marine vessel that is provided with a system that inhibits the movement of the marine vessel under its own power when the marine vessel is connected or recharging to a stationary source of energy on shore. This avoids significant damage that could otherwise occur if the marine vessel moves away or attempts to move away from the dock when connected by a cable or other device to a stationary structure. The system detects a potential connection between the boat and a stationary shore component, such as a source of energy, and inhibits the transmission from being placed in a forward or reverse gear position under those conditions. Similarly, if the boat is already in a forward or reverse gear position, the system inhibits its being placed into a battery recharging mode.

U.S. Pat. No. 9,054,555 is directed to systems and methods for charging a rechargeable battery device on a marine vessel that utilize a rechargeable battery device, a charger charging the battery device, and a control circuit. The control circuit calculates an amount of current that is available to charge the battery device based upon an amount of current that is available from the shore power source and an amount of current that is being drawn from the shore power source by devices other than a voltage charger and limits the amount of current being drawn by the voltage charger to charge the battery device to an amount that is equal to or less than the calculated amount of current that is available to charge the battery device. The control circuit can repeatedly calculate the amount of current that is available to charge the battery device and limit the amount of current being drawn by a voltage charger to charge the battery device to thereby actively adjust an amount of charge applied to the battery device.

U.S. Pat. No. 9,533,747 is directed to a hybrid propulsion system that has an internal combustion engine and an electric motor that each selectively powers a marine propulsor to propel a marine vessel. A plurality of batteries discharges current to power the motor. A controller is programmed to aggregate the recharge and/or discharge limits of plurality of batteries and then operate the system according to a method that preferably prevents internal fault and disconnection of batteries in the plurality.

U.S. Pat. No. 9,904,293 is directed to a system for automatically trailering a marine vessel that includes a set of coded tags coupled to a boat trailer, each storing data regarding its location on the trailer. A tag reader is located aboard the vessel, and estimates a first distance to a first coded tag in the set and a second distance to a second coded tag in the set. A position determination module uses the first and second estimated distances to determine position and heading of the vessel and the trailer in a given coordinate system. A feedback control module calculates a difference between the positions of the vessel and the trailer and a difference between the headings of the vessel and the trailer and determines vessel movements required to minimize the position and heading differences. A marine propulsion system automatically actuates a propulsion device to produce the required vessel movements to propel the vessel onto the trailer.

U.S. Pat. No. 11,518,261 is directed to a fast charging station for a marine vessel battery on a marine vessel. The fast charging station includes a dock battery, a charger that is operatively coupled to a power source and the dock battery, and an enclosure located on a dock structure in a body of water. The enclosure is configured to encapsulate the dock battery and the charger. The charger is configured to charge the dock battery using the power source when the marine vessel is not docked to the dock structure. The charger is further configured to charge the marine vessel battery using the power source and the dock battery when the marine vessel is docked to the dock structure.

U.S. patent application Ser. No. 17/695,200 is directed to an electric marine propulsion system configured to propel a marine vessel that includes a power storage system comprising a plurality of batteries and at least one electric motor powered by the power storage system and configured to rotate a propulsor to propel the marine vessel. A control system is configured to identify a charge level for each of the plurality of batteries and determine which of the plurality of batteries are active batteries based at least in part on the charge level on each of the plurality of batteries. A minimum power limit is then identified for the active batteries and a system power limit is determined based on the minimum power limit and the number of active batteries. The at least one electric motor is then controlled based on the system power limit such that the system power limit is not exceeded.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to an exemplary implementation of the present disclosure, a system for charging at least one electrical energy storage device on a marine vessel is provided. The system includes a charging structure having at least one structure charging pad. The at least one structure charging pad is coupled to a power source and is configured to wirelessly transfer power to at least one vessel charging pad on a marine vessel in order to charge the at least one electrical energy storage device on the marine vessel. The at least one vessel charging pad and the at least one structure charging pad are configured to be moved relative to each other to bring the at least one vessel charging pad and the at least one structure charging pad proximate each other such that a predetermined parameter is satisfied to charge the at least one electrical energy storage device using the power source for a sustained period.

According to another exemplary implementation of the present disclosure, a method for charging an electrical energy storage device on a marine vessel is provided. The method includes providing a charging structure comprising at least one structure charging pad, the at least one structure charging pad coupled to a power source, and configured to wirelessly transfer power to at least one vessel charging pad on a marine vessel in order to charge the electrical energy storage device on the marine vessel. The method further includes generating an electrical current on the charging structure using the power source, and supplying the electrical current to the at least one structure charging pad. The method further includes inducing an electrical current for a sustained period in the at least one vessel charging pad, and supplying the induced electrical current to the electrical energy storage device.

Various other features, objects, and advantages of the invention will be made apparent from the following description taken together with the drawings.

BRIEF DESCRIPTION OF DRAWINGS

Examples of systems and methods for automatically trailering a marine vessel are described with reference to the following Figures. The same numbers are used throughout the Figures to reference like features and like components.

DETAILED DESCRIPTION OF DRAWINGS

The presence of batteries and other rechargeable power sources on marine vessels provides numerous benefits, including the reduced consumption of fossil fuels. However, certain challenges surrounding charging these power sources remain. The present inventors have recognized that charging cables pose a significant risk of water ingress and corrosion to charging components when operated in marine environments. In addition, marine vessels in a body of water often cannot be fully fixed to a charging position, and if waves or other environmental conditions cause the marine vessel to drift away from the charging position, damage to the charging cable or the marine vessel could result. Operators can also accidentally drop charging cables into water, which may introduce contaminants into the charge plug that would increase a risk of an electrical short in the plug assembly. Although charging cables have protocols to prevent shock hazards, a malfunctioning charging cable in a body of water could generate a stray voltage field that could cause death or serious injury to persons in or around the body of water. For all of these reasons, the present inventors have recognized that a wireless charging system adapted for a marine environment and that mitigates or eliminates the above-described risks and challenges would be useful.

Figure 1:
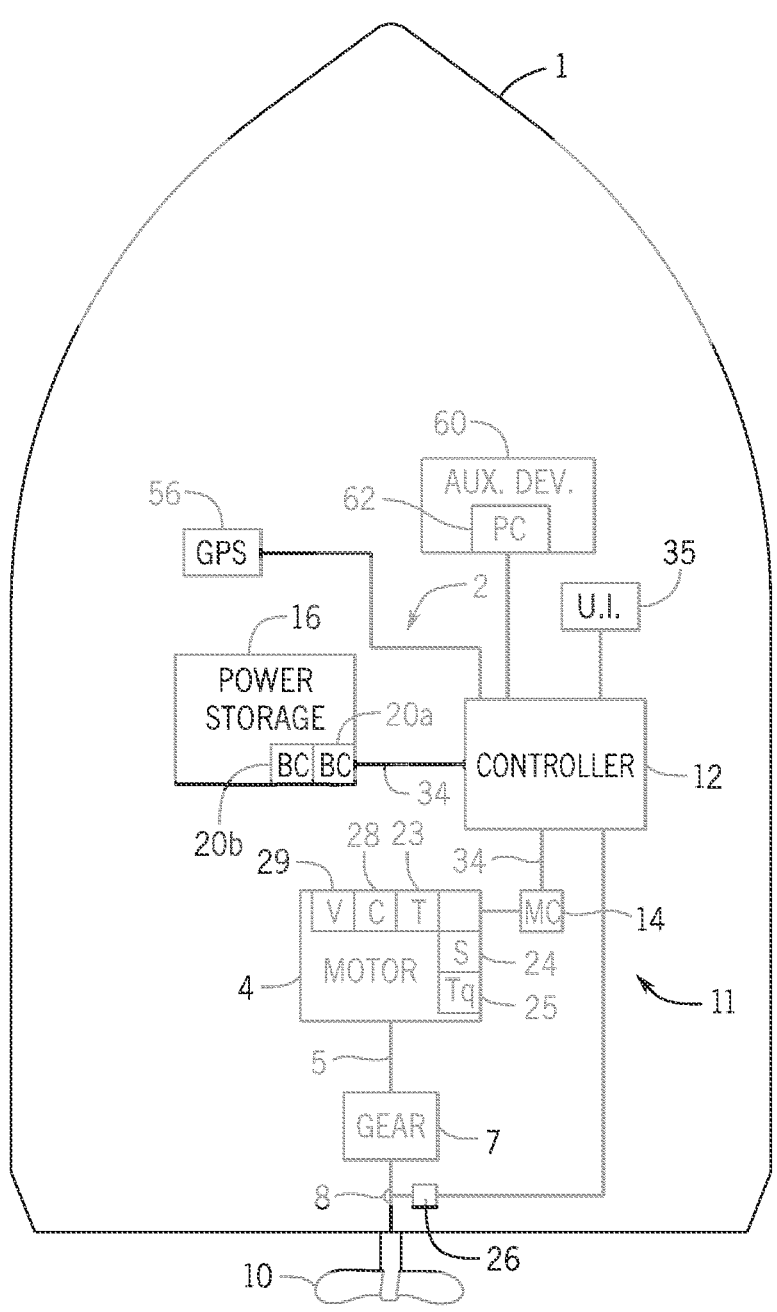
FIGS. 1-3 are schematic representations of a marine vessel having a power storage system according to an exemplary embodiment of the present disclosure.
Figure 2:
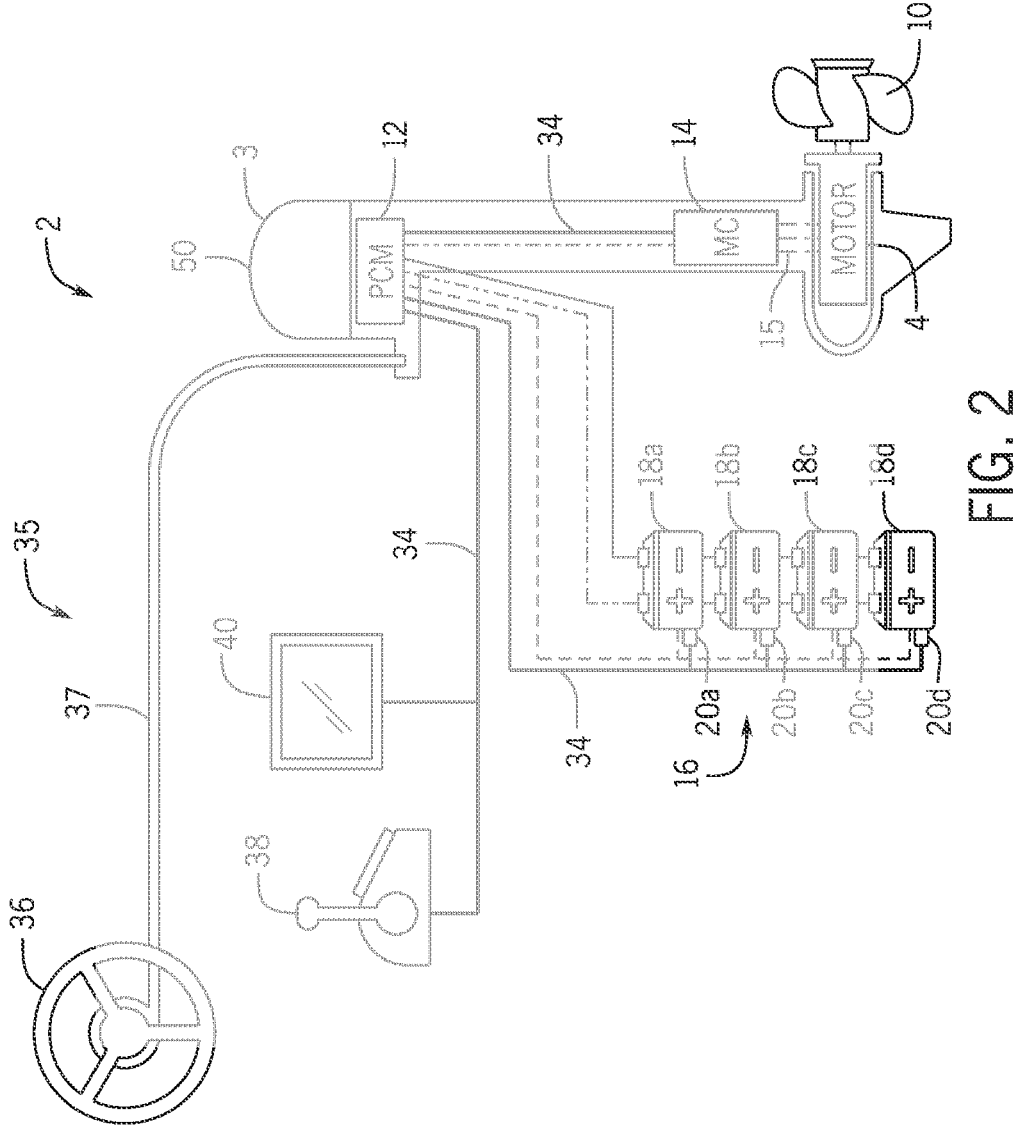

FIGS. 1 and 2 depict an exemplary embodiment of a marine vessel 1 having an electric marine propulsion system 2 configured to propel the marine vessel in a direction instructed by an operator via a steering control system, or by a guidance system configured to automatically control steering of the marine vessel to steer the vessel toward a predetermined location or global position. Referring specifically to FIG. 2, embodiments of the electric propulsion system 2 include at least one electric marine drive 3 having an electric motor 4 configured to propel the marine vessel 1 by rotating a propeller 10, as well as a power storage system 16, and a user interface system 35. In the depicted embodiment of FIG. 2, the electric marine propulsion system 2 includes an outboard marine drive 3 having an electric motor 4 housed therein, such as housed within the cowl 50 of the outboard marine drive. A person of ordinary skill in the art will understand in view of the present disclosure that the marine propulsion system 2 may include other types of electric marine drives 3, such as inboard drives or stern drives. The electric marine drive 3 is powered by the scalable storage device 16, such as including a plurality of batteries 18 connected in parallel.

The electric marine propulsion system 2 may include one or a plurality of electric marine drives 3, each comprising at least one electric motor 4 configured to rotate a propulsor, or propeller 10. The motor 4 may be, for example, a brushless electric motor, such as a brushless DC motor. In other embodiments, the electric motor may be a DC brushed motor, an AC brushless motor, a direct drive, a permanent magnet synchronous motor, an induction motor, or any other device that converts electric power to rotational motion. In certain embodiments, the electric motor 4 includes a rotor and a stator in a known configuration.

The electric motor 4 is electrically connected to and powered by a power storage system 16. The power storage system 16 stores energy for powering the electric motor 4 and is rechargeable, such as by connection to shore power when the electric motor 4 is not in use. Various power storage devices and systems are known in the relevant art. The power storage system 16 may be an electrical energy storage device system including a plurality of electrical energy storage devices (e.g., batteries 18 or banks of batteries). For example, the power storage system 16 may include a plurality of lithium-ion (LI) batteries 18, each LI battery 18 comprised of multiple battery cells. In other embodiments, the power storage system 16 may include a plurality of lead-acid batteries 18, flow batteries, ultracapacitors, and/or other rechargeable devices capable of storing and outputting electric energy.

Each battery 18a-18d may include an associated battery controller 20a-20d configured to identify a battery charge level and other battery parameters for that battery, such as battery temperature, and to determine a power limit for that battery based on the charge level (e.g., battery state of charge and/or battery voltage), battery temperature, battery state of health, etc. Each controller 20a-20d may also be configured to control whether the respective battery 18a-18d is connected to deliver power, and thus active, or is inactive and disconnected from and not delivering power to the marine drive(s) 3. For example, if the power limit for the battery 18a-18d is exceed, such as by a threshold amount or for a threshold period of time, then the controller 20a-20c may be configured to disconnect the battery 18a-18d in order to protect it from damage. Where a battery 18a-18d is in an inactive state, the respective controller 20a-20d may be configured to communicate a power limit of zero and/or to communicate an error indicating that the battery 18a-18d is not active or available to provide power.

The electric motor 4 is operably connected to the propeller 10 and configured to rotate the propeller 10. As will be known to the ordinary skilled person in the relevant art, the propeller 10 may include one or more propellers, impellers, or other propulsor devices and that the term "propeller" may be used to refer to all such devices. In certain embodiments, such as that represented in FIG. 1, the electric motor 4 may be connected and configured to rotate the propeller 10 through a gear system 7 or a transmission. In such an embodiment, the gear system 7 translates rotation of the motor output shaft 5 to the propeller shaft 8 to adjust conversion of the rotation and/or to disconnect the propeller shaft 8 from the drive shaft 5, as is sometimes referred to in the art as a "neutral" position where rotation of the drive shaft 5 is not translated to the propeller shaft 8. Various gear systems 7, or transmissions, are well known in the relevant art. In other embodiments, the electric motor 4 may directly connect to the propeller shaft 8 such that rotation of the drive shaft 5 is directly transmitted to the propeller shaft 8 at a constant and fixed ratio.

The power storage system 16 may further include a battery controller 20a-20d for each battery 18a-18d in the system, each battery controller 20a-20d configured to monitor and/or control the respective battery. The battery controller 20a-20d is configured to receive information from current, voltage, temperature, and/or other sensors within the respective battery 18a-18d, such as to receive information about the voltage, current, and temperature of each battery cell or group of battery cells. For example, the battery controller 20a-20d may receive inputs from one or more sensors, such as one or more voltage, current, and temperature sensors within a housing for the battery 18a-18d. Voltage sensors may be configured to sense voltage within the battery (such as cell voltage sensors configured to sense the voltage of individual cells or groups of cells in a LI battery) and one or more temperature sensors may be configured to sense a temperature within a housing. The battery controller 20a-20d is configured to calculate a charge level, such as a state of charge and/or a voltage (such as an open circuit voltage), of the battery 18a-18d, and may also be configured to determine a battery state of health and a current temperature for the battery 18a-18d. The battery controller 20a-20d may be further configured to determine a power limit for the battery 18a-18d, which is an amount of power that the battery 18a-18d can supply without overheating, over discharging, or otherwise compromising the battery. The battery controllers 20a-20d may be configured to communicate those values via a communication link 34 to other control devices in a control system 11.

A control system 11 controls the electric marine propulsion system 2, wherein the control system 11 may include a plurality of control devices configured to cooperate to provide the method of controlling the electric marine propulsion system described herein. For example, the control system 11 includes a central controller 12, a plurality of battery controllers 20a-20d, and one or more motor controllers 14, trim controllers, steering controllers, etc. communicatively connected, such as by a communication bus. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected.

Each controller may comprise a processor and a storage device, or memory, configured to store software and/or data utilized for controlling and or tracking operation of the electric propulsion system 2. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system 11 and peripheral devices.

Each electric motor 4 may be associated with a motor controller 14 configured to control power to the electric motor, such as to the stator winding thereof. The motor controller 14 is configured to control the function and output of the electric motor 4, such as controlling the torque outputted by the motor, the rotational speed of the motor 4, as well as the input current, voltage, and power supplied to and utilized by the motor 4. In one arrangement (see FIG. 2), the motor controller 14 controls the current delivered to the stator windings via the leads 15, which input electrical energy to the electric motor to induce and control rotation of the rotor.

In certain embodiments (see FIG. 1), various sensing devices (e.g., motor temperature sensor 23, motor speed sensor 24, motor torque sensor 25, propeller speed sensor 26, motor current sensor 28, and motor voltage sensor 29), may be configured to communicate with a local controller, such as the motor controller 14 or battery controller 20a-20d, and in other embodiments the sensors 23-25, 26, and 28-29 may communicate with the central controller 12 and one or more of the motor controller 14 and or battery controller 20a-20d may be eliminated. A GPS system 55 may also be configured to determine a current global position of the vessel, track vessel position over time, and/or determine vessel speed and direction of travel, and to provide such information to the controller 12. Alternatively or additionally, vessel speed may be measured by a speed-over-water sensor such as a pitot tube or a paddle wheel and such information may be provided to the controller 12. Controllers 12, 14, 20a-20d (and or the various sensors and systems) may be configured to communicate via a communication bus such as a CAN bus or a LIN bus, or by single dedicated communication links between controllers 12, 14, 20a-20d.

The central controller 12, which in the embodiment shown in FIG. 2 is a propulsion control module (PCM), communicates with the motor controller 14 via communication link 34, such a serial communication bus or other type of communication network (which may be a wired or wireless network implementation). To provide one example, the communication link 34 may be a CAN bus, such as a Kingdom Network. The controller also receives input from and/or communicates with one or more user interface devices in the user interface system 35 via the communication link, which in some embodiments may be the same communication link as utilized for communication between the controllers 12, 14, 20*a*-20*d* or may be a separate communication link. The user interface devices in the exemplary embodiment include a throttle lever 38 and a display 40. In various embodiments, the display 40 may be, for example, part of an onboard management system, such as the VesselView™ by Mercury Marine of Fond du Lac, Wisconsin. A steering wheel 36 is provided, which in some embodiments may also communicate with the controller 12 in order to effectuate steering control over the marine drive 3, which is well-known and typically referred to as steer-by-wire arrangements. In the depicted embodiment, the steering wheel 36 is a steer arrangement where the steering wheel 36 is connected to a steering actuator that steers the marine drive 3 by a steering cable 37. Other steering arrangements, such as various steer-by-wire arrangements, are well-known in the art and could alternatively be implemented.

The power storage system 16 may further be configured to power auxiliary devices 61 (see FIG. 1) on the marine vessel 1 that are not part of the propulsion system 2. For example, the auxiliary devices may include a bilge pump, a cabin lights, a stereo system or other entertainment devices on the vessel, a water heater, a refrigerator, an air conditioner or other climate/comfort control devices on the vessel, communication systems, navigation systems, or the like. Some or all of these accessory devices are sometimes referred to as a "house load" and may consume a substantial amount of battery power.

Figure 3:
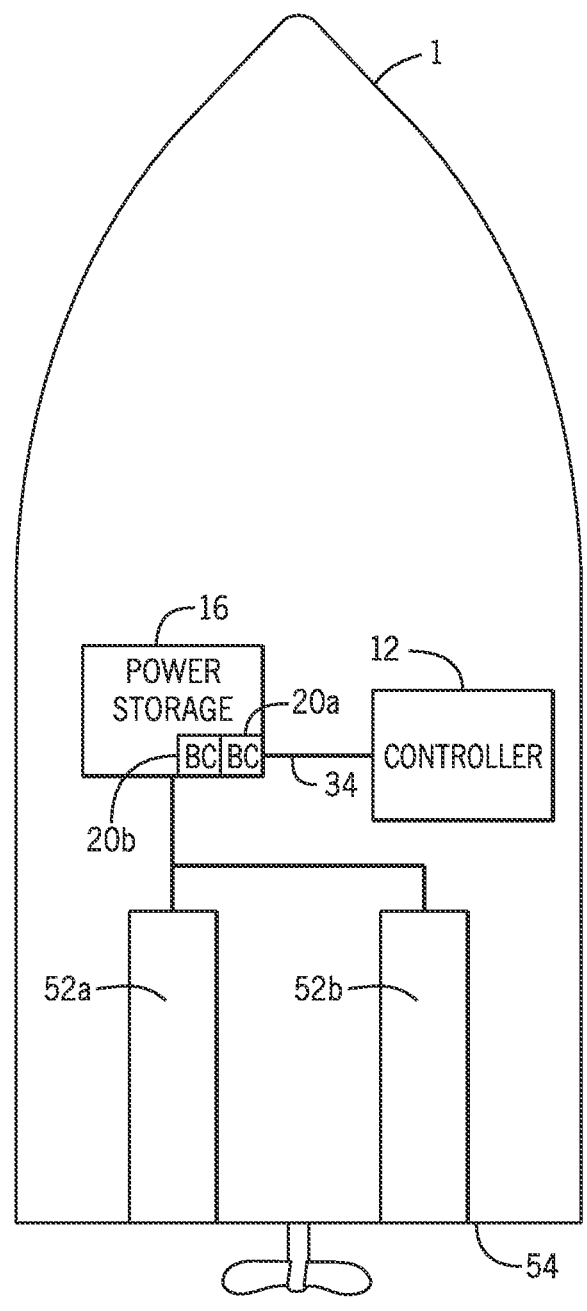

Referring now to FIG. 3, the marine vessel 1 is shown to include one or more vessel charging pads 52*a*, 52*b* that are electrically coupled to the power storage system 16 such that an electrical current can be induced in the charging pads 52*a*, 52*b* for the purpose of charging the power storage devices (e.g., batteries 18*a*-18*d*) of the power storage system 16. In an exemplary embodiment, the marine vessel 1 includes a pair of charging pads 52*a*, 52*b* located on a lower surface of the hull of the marine vessel 1 proximate the transom 54. Although some embodiments may include only a single charging pad located on the marine vessel, the use of a pair of charging pads is advantageous because the increased cross-sectional pad area may increase the potential power transfer and/or may increase the alignment tolerance between the charging pads by permitting the inclusion of redundant coils into the charging pad. In addition, the use of a pair of charging pads provides design symmetry to the marine vessel and redundancy in the case of failure or damage to one of the pair of charging pads.

While a pair of charging pads 52*a*, 52*b* is shown here, the number and location of the vessel charging pads 52*a*, 52*b* depicted in FIG. 3 is simply one embodiment of the present invention, and other marine vessels may include a different number of one or more vessel charging pads, which may be provided in different locations than that shown. For example, other marine vessels could include vessel charging pads located near the bow of the marine vessel, or on one or more of the port and starboard sides of the hull, or on the transom of the marine vessel. In still further embodiments, one or more vessel charging pads could be located on a swim platform of the marine vessel. Such charging pads provided on the swim platform could be configured to wirelessly couple to complementary charging pads on jet skis, eSurfboards, eHydrofoils or the like, to thereby charge the power storage systems of those vehicles.

The vessel charging pads 52*a*, 52*b* are configured to operate in concert with complementary charging pads on a charging structure (see structure charging pads 62*a*, 62*b*, FIGS. 4-7) using a process known as inductive magnetic coupling. Inductive magnetic coupling utilizes a time-varying magnetic field generated by a first closed loop of wire to induce a current in a second closed loop of wire. If the loops are configured to resonate at the same frequency, the amount of current induced in the second closed loop of wire increases, and in general, inductive magnetic coupling is a highly efficient means of transmitting power (i.e., end-to-end efficiency in excess of 90% can be achieved). The larger the loops, and the greater number of turns in the loops, the greater the distance that the charge can be transferred from the first closed loop of wire to the second closed loop of wire. In an exemplary embodiment, the vessel charging pads 52*a*, 52*b* are configured to directly contact the structure charging pads 62*a*, 62*b*, thus minimizing the distance between the closed loops. However, direct contact between the charging pads 52*a*, 52*b*, 62*a*, 62*b* is not required, and in other embodiments, some amount of separation between the pads may be maintained when the charging pads 52*a*, 52*b*, 62*a*, 62*b* are brought into proximity of each other for the purposes of charging. In an exemplary embodiment, one or more of the charging pads 52*a*, 52*b*, 62*a*, 62*b* includes an indicator light that is configured to illuminate when a predetermined parameter is satisfied (e.g., the pad is aligned within a predetermined threshold distance of another pad) and charging can commence. Alternatively, one or more indicator lights configured to indicate alignment of and power transfer between the charging pads 52*a*, 52*b*, 62*a*, 62*b* could be located on a charging structure (e.g., trailer 60). Further details of the charging pads 52*a*, 52*b*, 62*a*, 62*b* are included below with reference to FIGS. 6-9. In addition, although depicted herein as rectangular, the vessel charging pads 52*a*, 52*b* and structure charging pads 62*a*, 62*b* may have other shapes, geometries, or configurations. For example, in other embodiments, the charging pads 52*a*, 52*b*, 62*a*, 62*b* may have a square or circular geometry.

Figure 4:
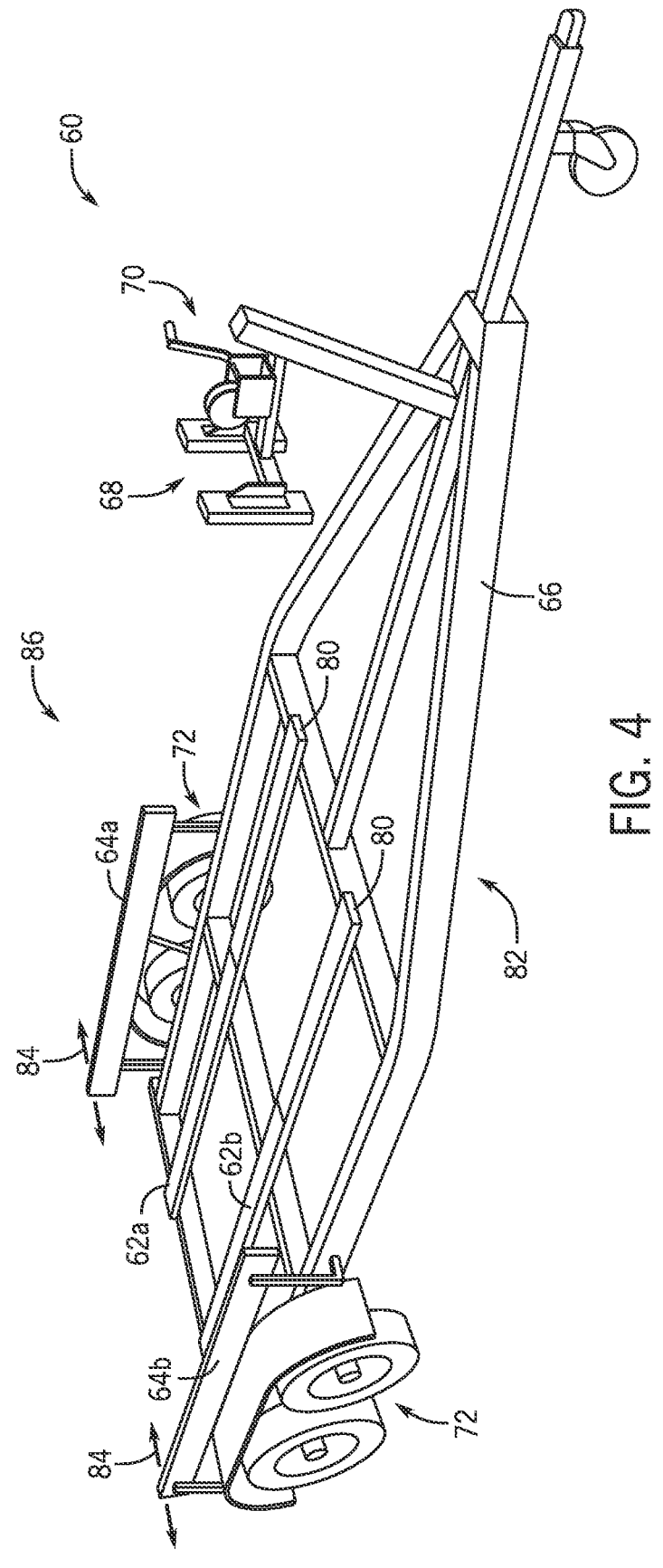
FIG. 4 is a schematic view of a trailer for marine vessels according to an exemplary embodiment of the present disclosure, the trailer shown to include structure charging pads configured to wirelessly charge the power storage system of the marine vessel of FIGS. 1-3.
Figure 5A:
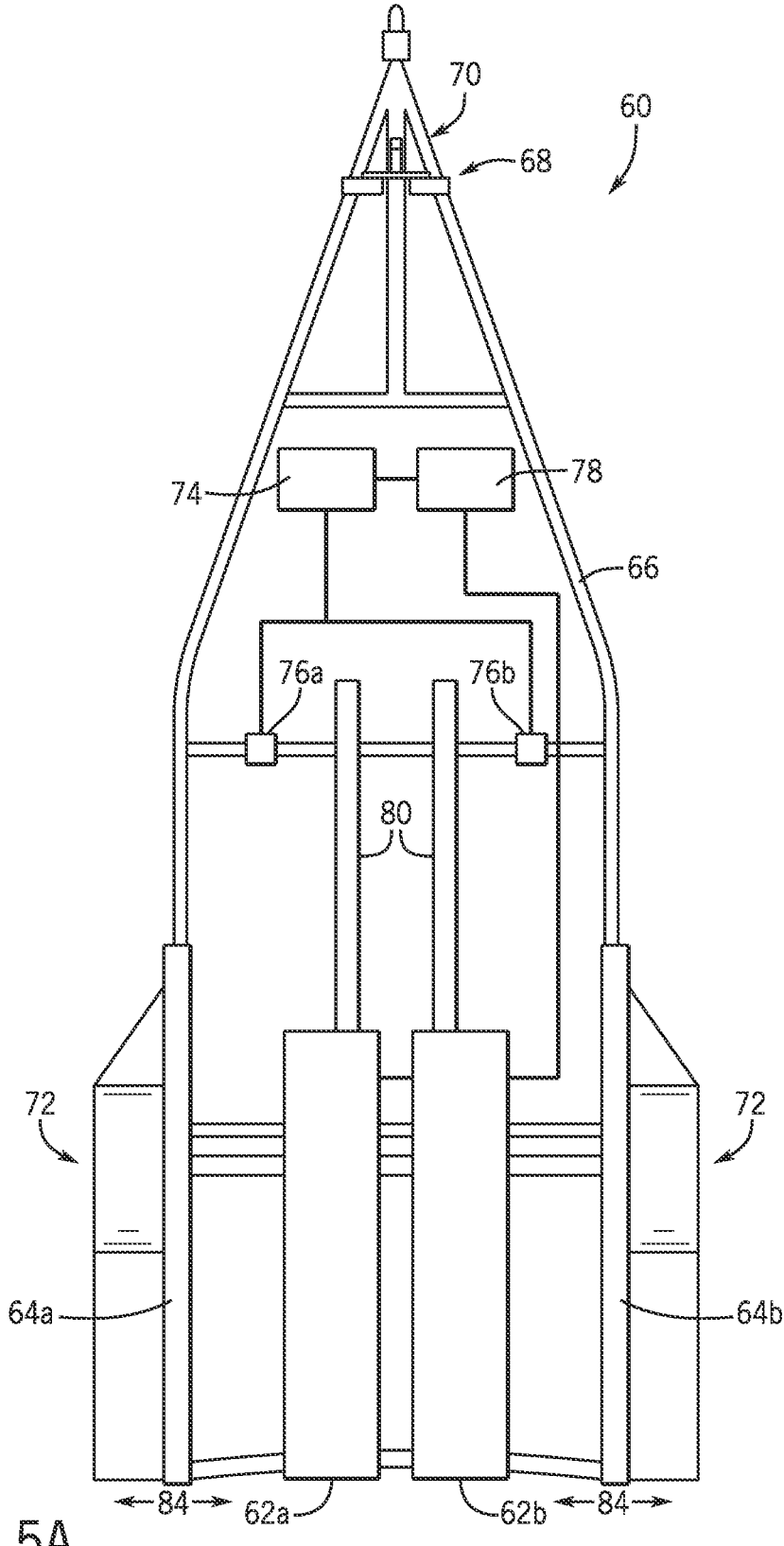
FIGS. 5A and 5B are schematic views of the trailer of FIG. 4 having an actuating system.
Figure 5B:
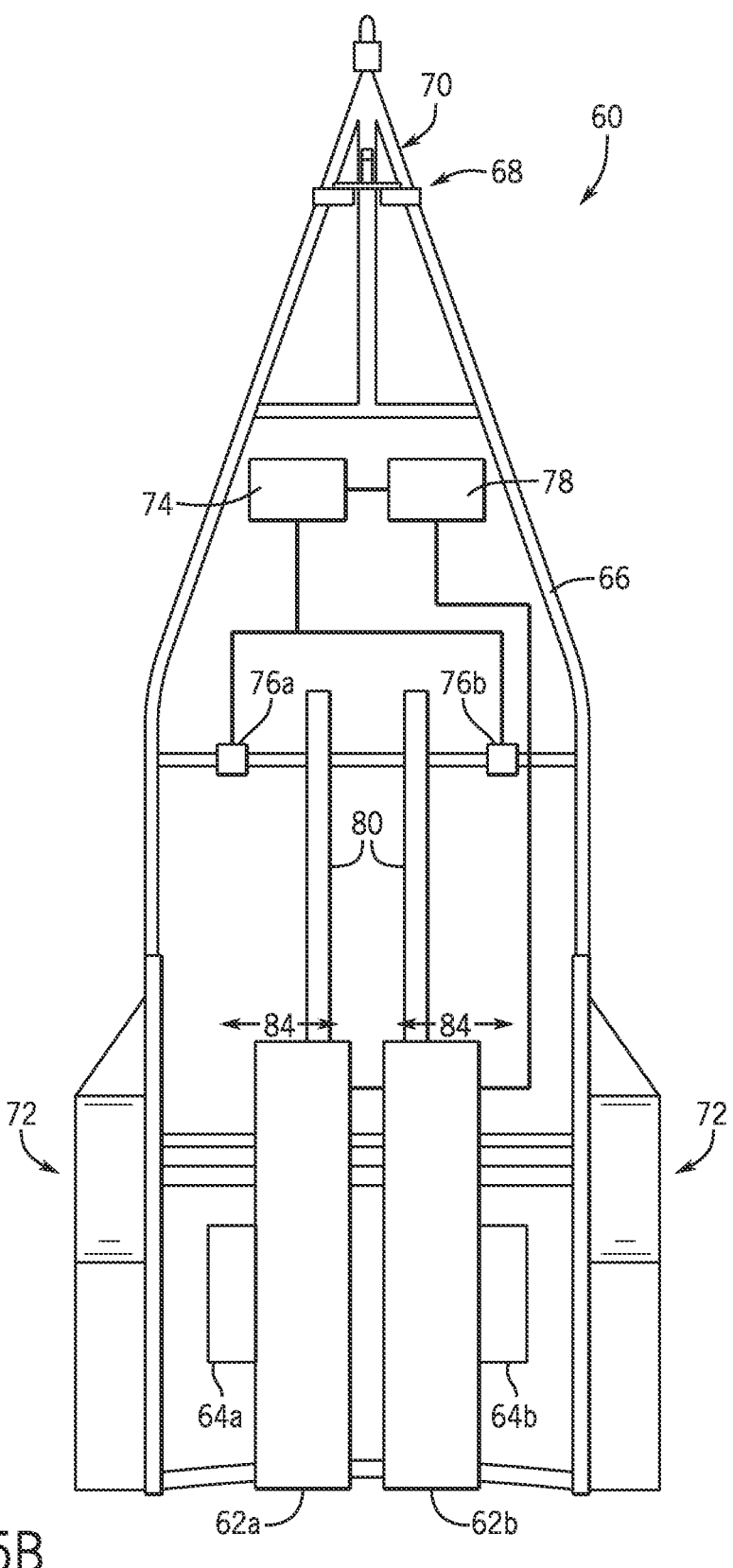

Turning now to FIGS. 4 and 5A-5B, exemplary charging structures are depicted in the form of a trailer 60 having a pair of structure charging pads 62*a*, 62*b*. Other suitable charging structures having charging pads configured to couple to vessel charging pads on the marine vessel may include, but are not limited to, boat lifts, dock structures, or any other structure capable of supporting a marine vessel. For example, in one embodiment, the charging structure could be a dry storage rack located in a marina. A forklift could be utilized to move the marine vessel relative to the dry storage rack in front to back or sideways directions until an indicator light on one or more of the charging pads indicate that the vessel charging pads are properly aligned with the structure charging pads located on the dry storage rack. As another example, if the vessel charging pads are located on the transom of the marine vessel, the vessel charging pads could be configured to couple to structure charging pads located on a dock by backing the marine vessel up to the dock to initiate charging.

The trailer 60 is configured to support the marine vessel 1 during transport over land. As shown in FIGS. 4 and 5A-5B, the trailer 60 includes a frame 66 with a bow stop 68 and winch 70 positioned at a first end proximate a tow vehicle coupling and tires 72 positioned at a second end opposite the first end. As is conventional, to load a marine vessel 1 on the trailer 60, the winch 70 may be attached to the marine vessel 1 and operated to pull the marine vessel 1 toward the bow stop 68. Structure charging pads 62a, 62b are shown to be coupled to bunks 80 that support a bottom surface of the hull of the marine vessel. In some embodiments, the charging pads 62a, 62b are rigidly fixed to the bunks 80, but in other embodiments the charging pads 62a, 62b may have some amount of compliance relative to the bunks 80 such that their positions can adapt to and align with the charging pads 52a, 52b once the marine vessel 1 is loaded onto the trailer 60. In addition, although FIGS. 4 and 5A-5B depict the structure charging pads 62a, 62b as coupled to the bunks 80 in order to align with charging pads 52a, 52b located on a lower surface of the hull of the marine vessel 1, the location of the structure charging pads 62a, 62b is not particularly limited, and the structure charging pads 62, 62b may be mounted anywhere on the trailer 60 such that they may be aligned with the charging pads 52a, 52b on the marine vessel 1. For example, if the vessel charging pads are located on the transom, the marine vessel could be first loaded on to the trailer, and then a structural member of the trailer containing the structure charging pads could be moved over the transom into a position to mate with the vessel charging pads.

In the exemplary embodiment depicted in FIG. 5A, the trailer 60 is shown to include actuators 64a, 64b configured to modify the position of the marine vessel 1 to bring the vessel charging pads 52a, 52b into alignment with the structure charging pads 62a, 62b such that inductive charging can occur between the pads 52a, 52b, 62a, 62b. In another exemplary embodiment depicted in FIG. 5B, the trailer 60 is shown to include actuators 64a, 64b coupled to the structure charging pads 62a, 62b and configured to move the structure charging pads 62a, 62b relative to the trailer 60. As used herein, bringing the pads 52a, 52b, 62a, 62b into "alignment" refers to moving the pads 52a, 52b, 62a, 62b within a predetermined threshold distance of each other. For example, the actuators 64a, 64b may be configured to move the marine vessel 1 as indicated by the arrows 84 (see FIGS. 4 and 5A) toward the port side 86 or the starboard side 82 of the trailer 60. In an exemplary embodiment, the predetermined threshold distance may not be more than a few inches, as substantial power transfer between the charging pads cannot occur if the pads are significantly misaligned.

As shown in FIG. 5B, the actuators 64a, 64b may be configured to move the charging pads 62a, 62b as indicated by the arrows 84. The type of actuator 64a, 64b is not particularly limited, and can be any type of actuator (e.g., linear hydraulic, linear pneumatic, linear electric) able to move the marine vessel 1 and/or the charging pads 52a, 52b small distances in any direction (e.g., a sideways direction, a front-back direction) to bring the vessel charging pads 52a, 52b into alignment with the structure charging pads 62a, 62b. In other embodiments, the charging pads 52a, 52b, 62a, 62b may include strong electromagnets capable of moving either the marine vessel 1 or one or more of the charging pads 52a, 52b, 62a, 62b to bring the charging pads into alignment with each other. Such electromagnets could be powered on and off by the operator so that the marine vessel 1 is able to be launched from the trailer 60 once charging is completed. In still further embodiments, the actuators could be coupled to the bunks 80 such that the bunks and the structure charging pads 62a, 62b move together to bring the structure charging pads 62a, 62b into alignment with the vessel charging pads 52a, 52b.

The trailer 60 is further shown to include a charging structure controller 74 (see FIGS. 5A and 5B) that is communicably coupled to the actuators 64a, 64b, as well as one or more sensing devices 76a, 76b and a charging power source 78. The charging structure controller 74 may be configured to control the operation of the actuators 64a, 64b based on data obtained by the sensing devices 76a, 76b. In various embodiments, the sensing devices 76a, 76b may be any type of sensor or detection device (e.g., ultrasonic sensors, infrared sensors, cameras, LIDAR sensors, RFID sensors, radar sensors, field effect transistor sensors, a volt meter, a current meter) that is capable of detecting a position of a charging pad 52a, 52b on the marine vessel 1 or alignment between the charging pads 52a, 52b, 62a, 62b. Based on the detected positions provided by the sensing devices 76a, 76b, the charging structure controller 74 may be configured to determine a difference between a current position of the vessel charging pads 52a, 52b and the structure charging pads 62a, 62b and operate one or more of the actuators 64a, 64b to move the marine vessel 1 such that the vessel charging pads 52a, 52b are brought into alignment with the structure charging pads 62a, 62b. Although FIGS. 5A and 5B depict the trailer 60 as having a pair of sensing devices 76a, 76b coupled to the trailer frame 66 between the bow stop 68 and the structure charging pads 62a, 62b, the one or more sensing devices could include any number of sensing devices, mounted in any locations on the trailer 60 that are suitable for detecting the positions of the vessel charging pads 52a, 52b on the marine vessel 1. In some embodiments, the sensing devices 76a, 76b could be coupled to an indicator light on the trailer 60 that is configured to illuminate when the vessel charging pads 52a, 52b are aligned with the structure charging pads 62a, 62b. If the trailer 60 does not include an actuating system, the indicator light could be used as feedback to an operator of a need to back off and reposition the marine vessel 1 on the trailer 60 if the indicator light is not illuminated to indicate charging pad alignment. In still further embodiments, in addition to or in place of the sensing devices 76a, 76b, control systems for the vessel charging pads 52a, 52b and/or structure charging pads 62a, 62b may be configured to detect whether a conductive object is nearby via detection and measurement of one or more parameters (e.g., an efficiency value, an inductance value, a resistance value, a quality (Q) factor). Charging may commence as soon as the measured parameter meets or exceeds a threshold for the predetermined parameter.

The charging power source 78 may be any source or source interface that provides the power used to generate a current in the structure charging pads 62a, 62b, and subsequently induce a current in the vessel charging pads 52a, 52b. For example, the charging power source 78 could include one or more batteries, fuel cells, capacitors or the like. In another embodiment, the charging power source 78 could be an interface to a standard shore power source or other grid power outlet. In still further embodiments, the charging power source 78 could include power supplied or harvested by a tow vehicle (e.g., via an alternator or generator).

Figure 6:
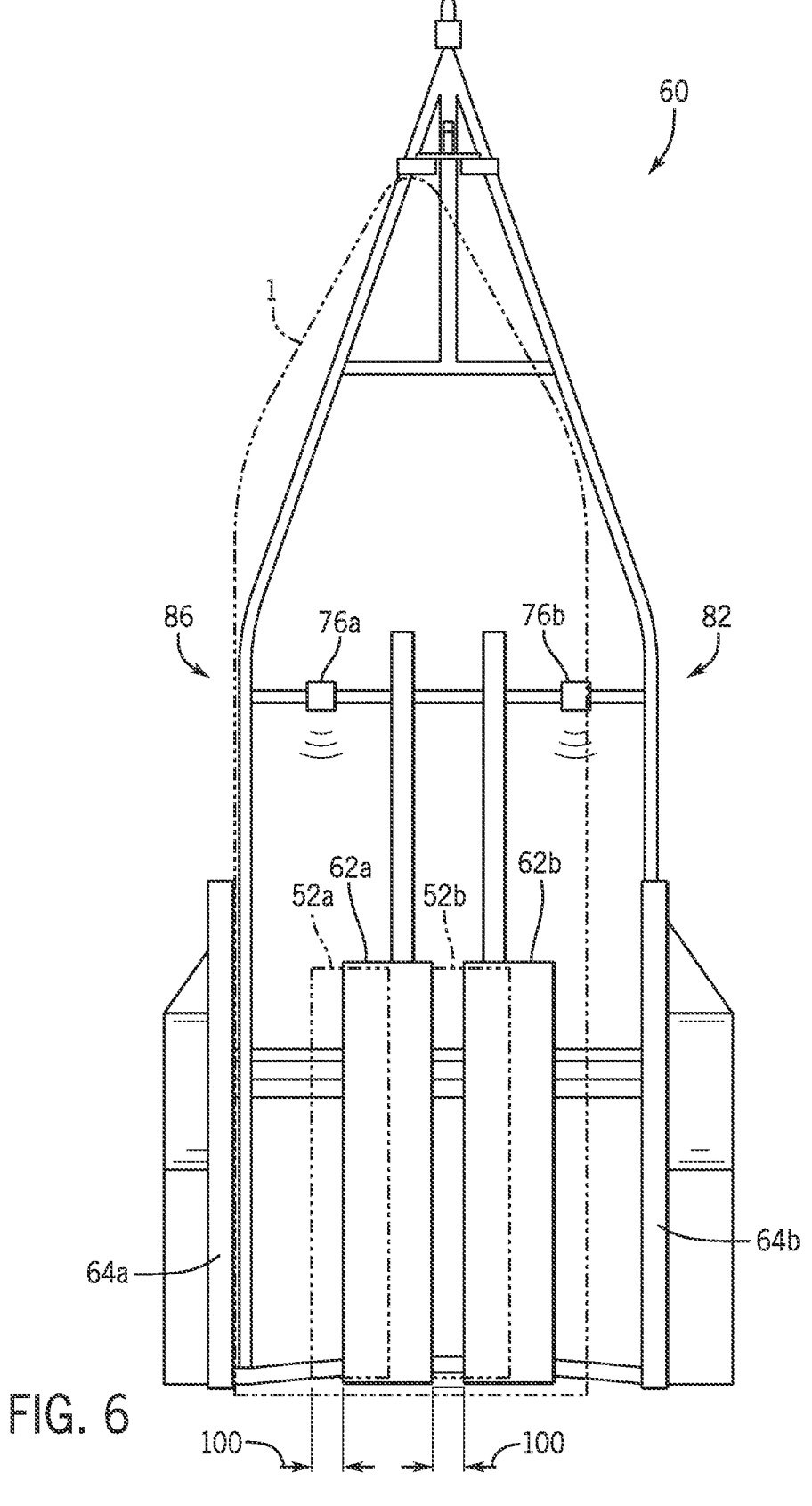
FIG. 6 depicts a schematic representation of the marine vessel of FIGS. 1-3 loaded onto the trailer of FIG. 4 prior to alignment of the vessel charging pads and the structure charging pads.
Figure 7:
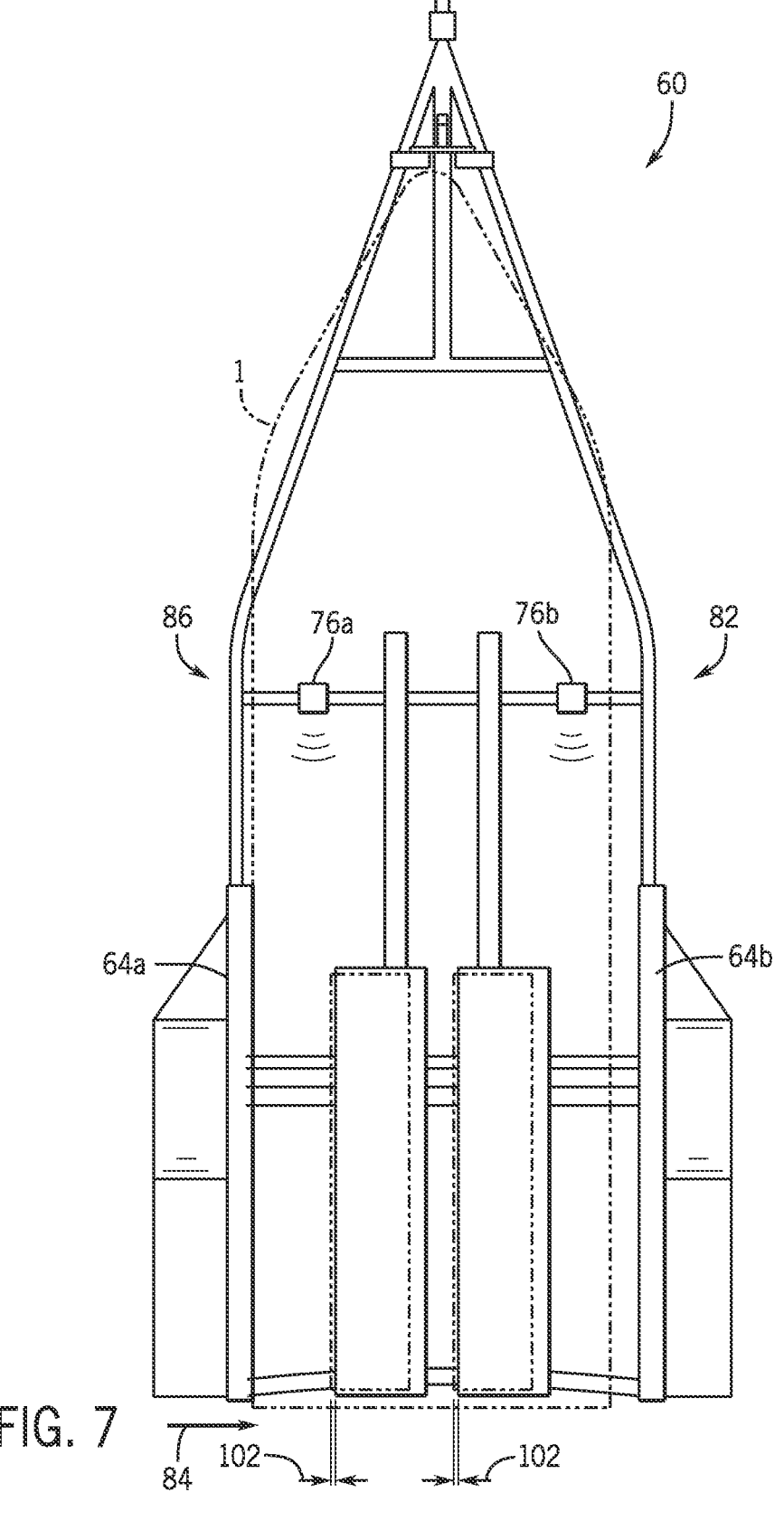
FIG. 7 depicts a schematic representation of the marine vessel of FIGS. 1-3 loaded onto the trailer of FIG. 4 after alignment of the vessel charging pads and the structure charging pads.

FIGS. 6 and 7 depict schematic diagrams as the marine vessel 1 is loaded onto the trailer 60 and the charging pads 52a, 52b, 62a, 62b are aligned relative to each other in order to initiate a charging operation. Further details regarding the alignment process are included below with reference to FIG. 9. As shown specifically in FIG. 6, there may be sufficient clearance between the marine vessel 1 and the trailer 60 such that a misalignment distance 100 between the vessel charging pad 52a with the structure charging pad 62a, and the vessel charging pad 52b with the structure charging pad 62b exceeds a predetermined threshold distance. In various embodiments, the predetermined threshold distance may depend on the characteristics of the charging pads 52a, 52b, 62a, 62b. For example, when the charging pad misalignment exceeds the predetermined threshold distance, the efficiency of power transfer from the structure charging pads 62a, 62b to the vessel charging pads 52a, 52b may be significantly degraded, or power transfer may become fully impossible. Accordingly, control systems for the charging pads 52a, 52b, 62a, 62b may be configured to determine an efficiency value for the rated power, and if the efficiency value does not meet or exceed a predetermined threshold, charging between the pads 52a, 52b, 62a, 62b will shut down after a short term charging period (e.g., a few seconds) is initiated and a sustained charging period will not occur.

Determination of the misalignment distance 100 may be based on the sensed positions of the charging pads 52a, 52b provided to the charging structure controller 74 by the sensing devices 76a, 76b. It could also be based on the power transfer efficiency between the coils of the charging pads 52a, 52b, 62a, 62b. As shown specifically in FIG. 7, when the misalignment distance 100 exceeds the predetermined threshold amount, the charging structure controller 74 commands actuator 64a to nudge the marine vessel 1 as indicated by arrow 84, towards the starboard side 82 of the trailer 60. Alternatively, if the trailer 60 is configured per the embodiment depicted in FIG. 5B, the charging structure controller 74 could command the actuators 64a, 64b to move the charging pads 62a, 62b and bring them into alignment with the vessel charging pads 52a, 52b. The charging structure controller 74 may be configured to stop operation of the actuator 64a once the sensing devices 76a, 76b indicate that the misalignment distance 102 between the vessel charging pad 52a with the structure charging pad 62a, and the vessel charging pad 52b with the structure charging pad 62b does not exceed the predetermined threshold distance, and a wireless power transfer operation can safely and efficiently proceed.

Figure 8:
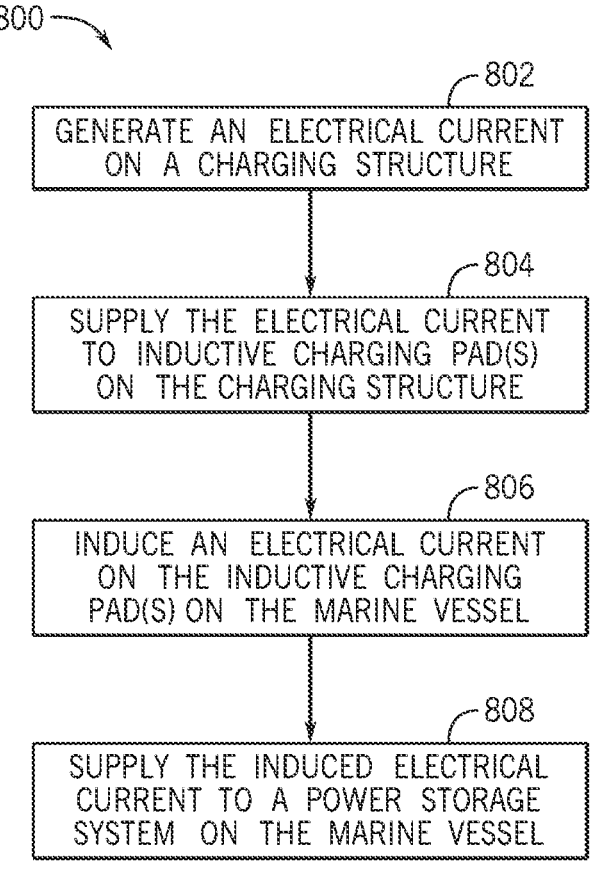
FIGS. 8-9 illustrate examples of methods for wirelessly charging the power storage system of the marine vessel of FIGS. 1-3.

Referring now to FIG. 8, a method 800 is depicted for charging a power storage system of a marine vessel using wireless power transfer according to an exemplary embodiment of the present disclosure. At step 802, the charging structure controller 74 may command the charging power source 78 to generate an electrical current that is supplied to the structure charging pads 62a, 62b at step 804.

At step 806, an electrical current is induced in the vessel charging pads 52a, 52b. Current may be inducted in the vessel charging pads 52a, 52b provided that the charging pads are aligned within a predetermined threshold distance of each other and have begun wirelessly communicating with each other, as described in further detail below. In an exemplary embodiment, current 806 is only induced in the vessel charging pads 52a, 52b if it is determined that no foreign objects (e.g., debris, a person's appendage, an animal) are located in the space between the charging pads 52a, 52b, 62a, 62b. Finally, at step 808, the induced electrical current in the vessel charging pads 52a, 52b is supplied to the power storage system 16. As described above, the induced electrical current may be utilized to charge the batteries 18a-18d as controlled by the battery controllers 20a-20d. The induced electrical current could further be utilized to supply power to auxiliary devices 61.

Figure 9:
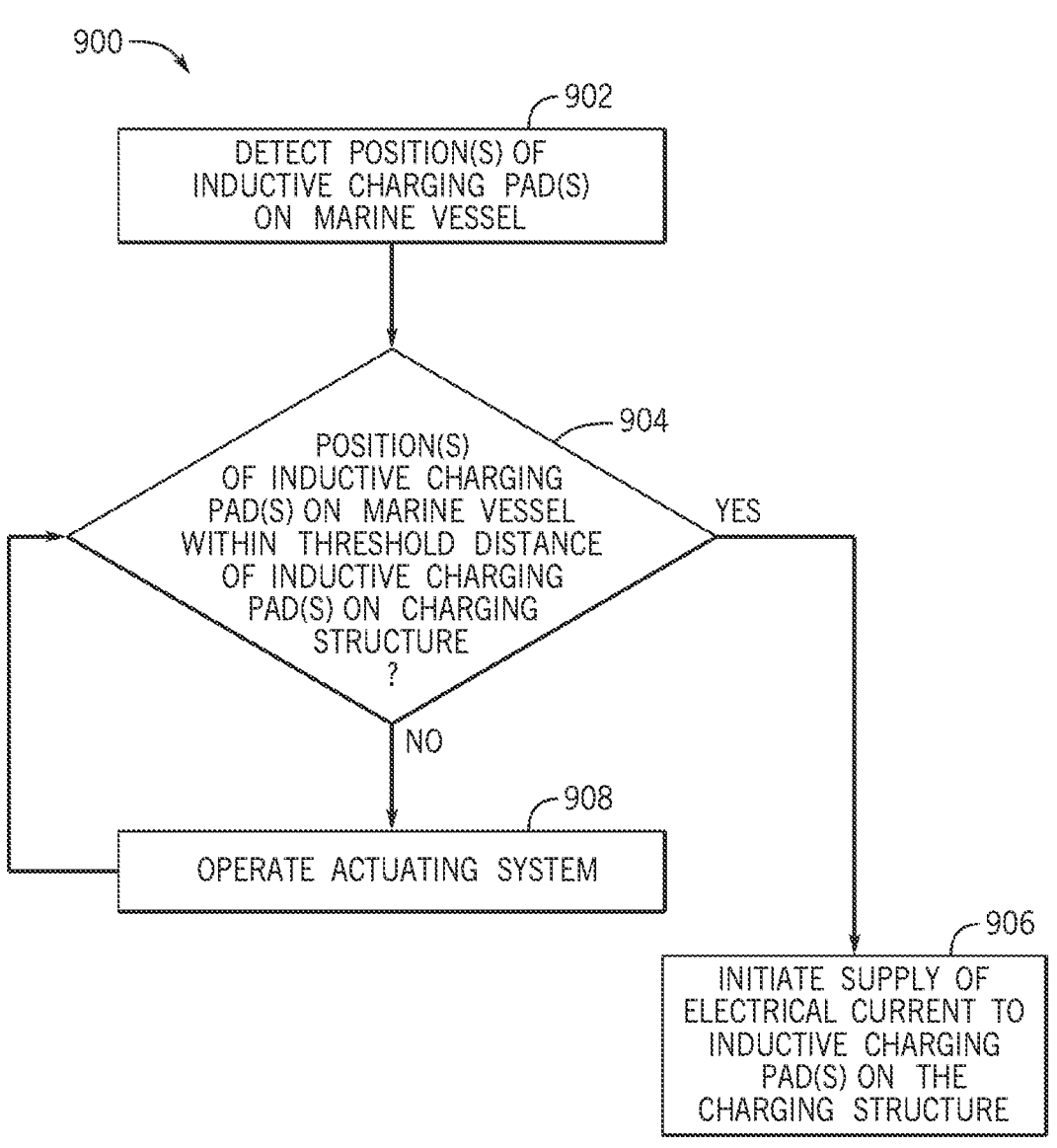

FIG. 9 depicts another method 900 for charging a power storage system of a marine vessel through wireless power transfer according to an exemplary embodiment of the present disclosure. In various embodiments, method 900 may be performed in addition to method 800, as described above. Method 900 may commence with step 902 in which the positions of the vessel charging pads 52a, 52b are determined by the charging structure controller 74 based on data received from the sensing devices 76a, 76b. At step 904, the charging structure controller 74 determines whether the positions of the vessel charging pads 52a, 52b result in a misalignment distance between the between the vessel charging pad 52a with the structure charging pad 62a, and the vessel charging pad 52b with the structure charging pad 62b within the predetermined threshold distance. If the misalignment is within the predetermined threshold distance, method 900 proceeds to step 906, and the charging structure controller 74 initiates the supply of electrical current to the structure charging pads 62a, 62b using the charging power source 78. In some embodiments, initiation of electrical current may commence automatically as soon as the charging pads 52a, 52b, 62a, 62b are aligned within the predetermined threshold distance of each other and have begun wireless communications with each other using any suitable wireless protocol. Initiation of electrical current at step 906 may further be based upon a determination that a foreign object is not located between the charging pads 52a, 52b and 62a, 62b, using any known method, to avoid heating the foreign object and initiating a thermal event. In other embodiments, the structure controller 74 initiates the supply of electrical current upon receipt of a signal from an operator. For example, the operator may input a command to start charging at the user interface system 35, and the command may be wirelessly transmitted to the structure controller 74.

Returning to step 906, if the charging structure controller 74 determines that the positions of the vessel charging pads 52a, 52b result in a misalignment distance between the between the vessel charging pad 52a with the structure charging pad 62a, and the vessel charging pad 52b with the structure charging pad 62b exceeding the predetermined threshold distance (see FIG. 6), method 900 proceeds to step 908. At step 908, the charging structure controller 74 operates the actuating system to move the vessel 1 and/or the charging pads 62a,62b until the misalignment between the charging pads 52a, 52b, 62a, 62b is within the predetermined threshold distance (see FIG. 7) and the method 900 terminates at step 906. As described above, the distance between the charging pads 52a, 52b, 62a, 62b is merely one example of a predetermined parameter that must be satisfied before charging can either commence or be sustained for a period beyond a short term initial charging period (e.g., a few seconds), and in other embodiments, a different parameter may be utilized.

Various other modifications of the system described above are contemplated to be within the scope of the present invention. For example, the actuators, sensing devices, and charging structure controller described above as located on the trailer charging structure could instead be located on the marine vessel. Rather than sensing the position of the vessel charging pads, the sensing devices could detect the positions of the structure charging pads and operate the actuators on the marine vessel to move the marine vessel and/or the vessel charging pads relative to the trailer and align the vessel charging pads with the structure charging pads. In addition, although the mechanism of power transfer is described above as flowing from the charging structure to the marine vessel, the direction of transfer could be reversed, and a current generated by the power storage system on the marine vessel could be utilized to an induce a current in the structure charging pads and charge a power storage device located on the charging structure.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for charging at least one electrical energy storage device on a marine vessel, the system comprising:
a charging structure comprising at least one structure charging pad, the at least one structure charging pad coupled to a power source and configured to wirelessly transfer power to at least one vessel charging pad on the marine vessel in order to charge the at least one electrical energy storage device on the marine vessel;
wherein the at least one vessel charging pad and the at least one structure charging pad are configured to be moved relative to each other to bring the at least one vessel charging pad and the at least one structure charging pad proximate each other such that a predetermined parameter is satisfied to charge the at least one electrical energy storage device using the power source for a sustained period; and
wherein the at least one vessel charging pad is located on a hull of the marine vessel configured to be supported by the charging structure.

2. The system of claim 1, wherein the charging structure is a trailer configured to support the marine vessel during travel of the charging structure over land.

3. The system of claim 1, wherein the charging structure is a lift configured to support the marine vessel.

4. The system of claim 1, further comprising an actuating system configured to move at least one of the marine vessel, the charging structure, the at least one vessel charging pad, or the at least one structure charging pad to align the at least one vessel charging pad and the at least one structure charging pad such that the predetermined parameter is satisfied.

5. The system of claim 4, wherein the actuating system is coupled to the charging structure.

6. The system of claim 4, wherein the actuating system is coupled to the marine vessel.

7. The system of claim 4, further comprising:
at least one sensing device configured to determine a sensed position of at least one of the at least one vessel charging pad and the at least one structure charging pad; and
a charging controller configured to operate the actuating system based on the sensed position of the at least one vessel charging pad and the at least one structure charging pad.

8. The system of claim 7, wherein the at least one sensing device comprises at least one of a camera, a LIDAR sensor, an RFID sensor, a radar sensor, a volt meter, and a current meter.

9. The system of claim 1, wherein the at least one vessel charging pad comprises at least two vessel charging pads, and wherein the at least one structure charging pad comprises at least two structure charging pads.

10. A method for charging an electrical energy storage device on a marine vessel, the method comprising:
providing a charging structure comprising at least one structure charging pad, the at least one structure charging pad coupled to a power source, and configured to wirelessly transfer power to at least one vessel charging pad on the marine vessel in order to charge the electrical energy storage device on the marine vessel;
wherein the at least one vessel charging pad is located on a hull of the marine vessel configured to be supported by the charging structure;
generating an electrical current on the charging structure using the power source;
supplying the electrical current to the at least one structure charging pad;
inducing an electrical current for a sustained period in the at least one vessel charging pad; and
supplying the induced electrical current to the electrical energy storage device.

11. The method of claim 10, further comprising, prior to inducing the electrical current for the sustained period in the at least one vessel charging pad, moving the marine vessel and the charging structure relative to each other to bring the at least one vessel charging pad and the at least one structure charging pad proximate each other such that a predetermined parameter is satisfied.

12. The method of claim 11, wherein inducing the electrical current for the sustained period in the at least one vessel charging pad automatically occurs responsive to the at least one vessel charging pad and the at least one structure charging pad being located proximate each other such that the predetermined parameter is satisfied.

13. The method of claim 11, wherein inducing the electrical current for the sustained period in the at least one vessel charging pad occurs responsive to an operator input once the at least one vessel charging pad and the at least one structure charging pad are located proximate each other such that the predetermined parameter is satisfied.

14. The method of claim 11, wherein moving the marine vessel and the charging structure relative to each other comprises operating an actuating system.

15. The method of claim 14, wherein the actuating system is coupled to the charging structure.

16. The method of claim 14, wherein the actuating system is coupled to the marine vessel.

17. The method of claim 14, further comprising determining a sensed position of at least one of the at least one vessel charging pad and the at least one structure charging pad using at least one sensing device and operating the actuating system based on the sensed position.

18. The method of claim 17, wherein the at least one sensing device comprises at least one of a camera, a LIDAR sensor, an RFID sensor, a radar sensor, a volt meter, and a current meter.

19. The method of claim 10, wherein the charging structure is a trailer configured to support the marine vessel during travel of the charging structure over land.

20. The method of claim 10, wherein the charging structure is a lift configured to support the marine vessel.

21. The method of claim 10, further comprising, prior to inducing the electrical current for the sustained period in the at least one vessel charging pad, moving the at least one vessel charging pad and the at least one structure charging pad relative to each other to bring the at least one vessel charging pad and the at least one structure charging pad proximate each other such that a predetermined parameter is satisfied.

22. The method of claim 21, wherein moving the at least one vessel charging pad and the at least one structure charging pad relative to each other comprises operating an actuating system.

\* \* \* \* \*